US012741979B2

(12) United States Patent
Sale et al.

(10) Patent No.: US 12,741,979 B2
(45) Date of Patent: Sep. 22, 2026

(54) PROCESS FOR PREPARING A PHOSPHORAMIDITE AND FURTHER REACTION THEREOF TO THE MONOPHOSPHITE

(71) Applicant: Evonik Oxeno GmbH & Co. KG, Marl (DE)

(72) Inventors: Anna Chiara Sale, Recklinghausen (DE); Robert Franke, Marl (DE); Dirk Fridag, Haltern am See (DE); Peter Kucmierczyk, Herne (DE); Ana Markovic, Haltern am See (DE); Armin Börner, Rostock (DE); Jens Holz, Kessin (DE); Kerstin Romeike, Rostock (DE); Gudrun Wenzel, Kessin (DE)

(73) Assignee: Evonik Oxeno GmbH & Co. KG, Marl (DE)

( * ) Notice: Subject to any disclaimer, the term of this patent is extended or adjusted under 35 U.S.C. 154(b) by 465 days.

(21) Appl. No.: 18/541,660

(22) Filed: Dec. 15, 2023

(65) Prior Publication Data

US 2024/0217994 A1 Jul. 4, 2024

(30) Foreign Application Priority Data

Dec. 27, 2022 (EP) .................................... 22216774

(51) Int. Cl.
*C07F 9/145* (2006.01)

(52) U.S. Cl.
CPC .................................... *C07F 9/145* (2013.01)

(58) Field of Classification Search
CPC ....................................................... C07F 9/145
See application file for complete search history.

(56) References Cited

U.S. PATENT DOCUMENTS 9,751,904 B2 9/2017 Dyballa et al.
9,840,524 B2 12/2017 Dyballa et al.
2015/0336861 A1 11/2015 Geilen et al.
2022/0106361 A1 4/2022 Fuhrmann et al.
2024/0217999 A1 7/2024 Sale et al.

FOREIGN PATENT DOCUMENTS

| | | | |
|---|---|---|---|
| CN | 106414467 | A | 2/2017 |
| CN | 106939059 | A | 3/2019 |
| JP | 2015-218174 | A | 12/2015 |
| JP | 2017-515874 | A | 6/2017 |
| WO | 2015/176929 | A1 | 11/2015 |

OTHER PUBLICATIONS

U.S. Appl. No. 18/541,692, filed Dec. 15, 2023, Sale et al.

Extended European Search Report mailed Jun. 22, 2023 for European Application No. 22216774.4 (7 pages in German; 7 pages English translation).

Ismail, M.N., et al. Preparation and Evaluation of Some Novel Organo-Phosphorus Compounds as Antioxidants and Antifatique Agents in Rubber. Journal of Applied Polymer Science. 2002. vol. 83, No. 14. pp. 2984-2992.

Office Action mailed Apr. 1, 2025 for Japanese Pateent Application No. 2023-208242 (5 pages in Japanese; 4 pages English translation).

Grice, Kyle A. et al. Intramolecular C—H Activation by Air-stable Pt(II) Phosphite Complexes. Journal of Organometallic Chemistry. 2015. vol. 799-800, pp. 201-207.

Sawamura, Yasuhiro, et al. "Phosphite-urea" cooperative high-turnover catalysts for the highly selective bromocyclization of homogeranylarenes. Chemical Science, 2013, vol. 4, No. 11, pp. 4181-4186 and Supplemental Information.

Nifantiev, Edward E., et al. Amides of Trivalent Phosphorus Acids as Phosphorylating Reagents for Proton-Donating Nucleophiles. Chemical Reviews, 2000. vol. 100, No. 10, pp. 3774-3799.

Phillips, Don I., et al. Rates of ionization of phosphoranes. Journal of the American Chemical Society. 1975. vol. 98, No. 1, pp. 184-189.

Burgada, Ramon, Contribution a L'Étude des Amides Organiques de L'Amides Organiques de L'Acide Phosphoreux. Ann. Chim., 1963, vol. 8, 1363, No. 5-6, pp. 347-381.

*Primary Examiner* — Renee Claytor
*Assistant Examiner* — Christopher Lindsay Johnson
(74) *Attorney, Agent, or Firm* — Smith, Gambrell & Russell, LLP

(57) ABSTRACT

Process for preparing a phosphoramidite and further reaction thereof to the monophosphite.

14 Claims, No Drawings

PROCESS FOR PREPARING A PHOSPHORAMIDITE AND FURTHER REACTION THEREOF TO THE MONOPHOSPHITE

The invention relates to a process for preparing a phosphoramidite and further reaction thereof to the monophosphite.

Monophosphites are classically prepared using Cl-containing compounds or via Cl-containing intermediates.

As described in WO 2015/176929 A1, chlorine residues from the synthesis remain in the organophosphorus compound, which results in problems when using the organophosphorus compounds. For example, the steel of the reactor may be attacked by the chlorine.

Monophosphites prepared using Cl-containing compounds must be laboriously purified after synthesis in order to reduce the Cl content. However, even after laborious purification, Cl residues still remained in the monophosphite, which result in problems with the further use of the compound.

The technical object of the invention is to provide a process in which the problems arising in relation to the prior art are reduced or eliminated.

The object is achieved by a process according to Claim 1.

Process comprising the process steps of:

a) initially charging a compound of the formula (I):

(I)

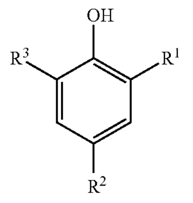

wherein $R^1$, $R^2$, $R^3$ are selected from: —H, —$(C_1$-$C_{12})$-alkyl, —O—$(C_1$-$C_{12})$-alkyl, —$(C_6$-$C_{10})$-aryl, —CN, —$NO_2$;

b) adding $P(NX_2)_3$, where X is —$(C_1$-$C_6)$-alkyl;

c) reacting the compound from a) and b) to give a compound of the formula (II):

(II)

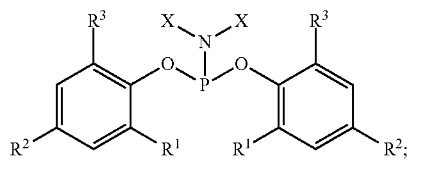

d) adding the compound of the formula (I):

(I)

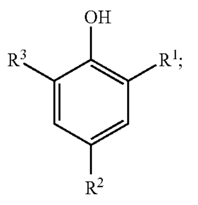

e) adding a compound Y, wherein Y is a five-membered ring in which at least one carbon atom has been replaced by a nitrogen atom;

f) reacting the compounds from c) to e) to give a compound of the formula (III):

(III)

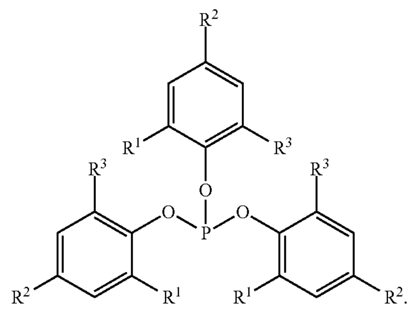

Examples of a five-membered ring in which a carbon atom has been replaced by a nitrogen atom are:

pyrrolidine, 2-pyrroline, 3-pyrroline, azole.

Examples of a five-membered ring in which two carbon atoms have been replaced by nitrogen atoms are:

diazolidine, 1,2-diazole, 1,3-diazole.

Examples of a five-membered ring in which three carbon atoms have been replaced by nitrogen atoms are:

1,2,3-triazolidine, 1,2,4-triazolidine, 1,2,3-triazole, 1,2,4-triazole.

Examples of a five-membered ring in which four carbon atoms have been replaced by nitrogen atoms are:

tetrazolidine, 5H-tetrazole, 2,5-dihydro-1H-tetrazole.

An example of a five-membered ring in which five carbon atoms have been replaced by nitrogen atoms is:

1H-pentazole.

In one variant of the process, $R^1$, $R^2$, $R^3$ are selected from: —H, —$(C_1$-$C_{12})$-alkyl, —O—$(C_1$-$C_{12})$-alkyl, —$(C_6$-$C_{10})$-aryl.

In one variant of the process, $R^1$, $R^2$, $R^3$ are selected from: —H, —$(C_1$-$C_{12})$-alkyl, —O—$(C_1$-$C_{12})$-alkyl.

In one variant of the process, $R^1$, $R^2$, $R^3$ are selected from: —H, —$(C_1$-$C_{12})$-alkyl.

In one variant of the process, $R^1$, $R^2$, $R^3$ are selected from: —H, —$CH_3$, —O—$CH_3$, —$_{tert}$Bu.

In one variant of the process, the compound of the formula (I) has the structure (1):

(1)

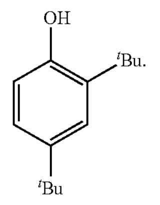

In one variant of the process, X is —$(C_1$-$C_2)$-alkyl.

In one variant of the process, X is —$CH_3$.

In one variant of the process, the five-membered ring (Y) has at least one double bond.

In one variant of the process, the five-membered ring (Y) has two double bonds.

In one variant of the process, the five-membered ring (Y) has at least one N—H bond.

In one variant of the process, the five-membered ring (Y) has at least two nitrogen atoms.

In one variant of the process, the five-membered ring (Y) has at least three nitrogen atoms.

In one variant of the process, the five-membered ring (Y) has four nitrogen atoms.

In one variant of the process, Y is the following compound:

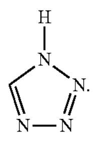

In one variant of the process, said process comprises the additional process step c'): c') adding a solvent.

In one variant of the process, the solvent is selected from: acetonitrile, toluene, xylene, THF, heptane.

In one variant of the process, the solvent is toluene.

In one variant of the process, the synthesis is carried out in the absence of Cl.

The invention is to be illustrated in more detail hereinafter by a working example.

Syntheses of Alkanox

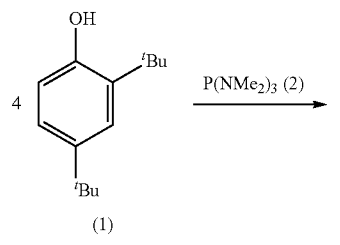

(1)

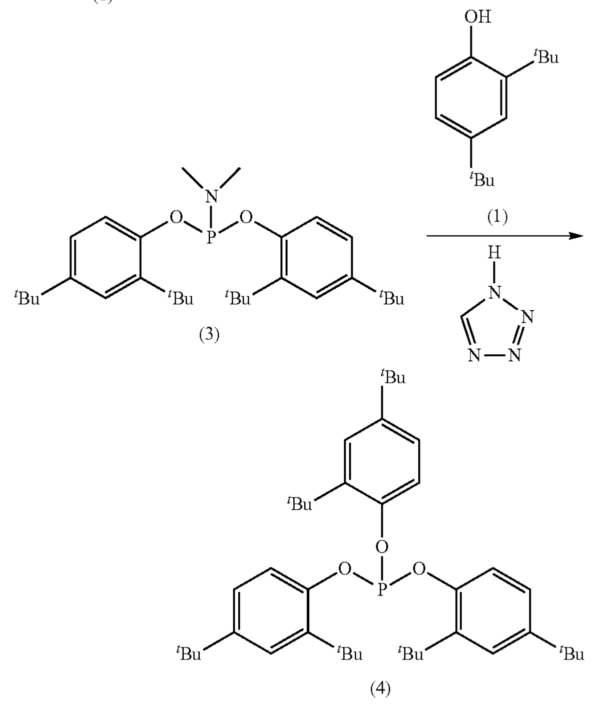

(3)

(4)

In a Schlenk vessel, 2,4-di-tert-butylphenol (1) (413 mg, 2 mmol) and HMPT (2) (82 mg, 0.5 mmol) are dissolved in toluene (5 ml) and the mixture stirred at 100° C. under a gentle stream of argon. After ca. 3 days, the maximum formation of the intermediate bis(2,4-di-tert-butylphenyl) dimethylphosphoramidite (3) (8p=+137.7 ppm in toluene) has been completed and the solution is concentrated under vacuum. The residue with the excess phenol derivative is then mixed with a tetrazole solution (6.4 ml, 0.45M tetrazole in acetonitrile) and stirred overnight at room temperature. After about half an hour, a white precipitate begins to precipitate. After filtration and washing with acetonitrile (3 ml), alkanox (4) is obtained at a yield of 56%.

The novel synthetic route makes it possible to dispense with Cl-containing compounds. Firstly, this saves the laborious purification of the diphosphite after synthesis, and secondly the introduction of residual Cl into the reactor is also avoided.

The invention claimed is:

1. A process of preparing a compound of Formula (III) comprising the steps of:

a) initially charging a compound of the formula (I):

(I)

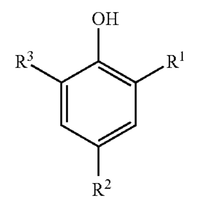

wherein $R^1$, $R^2$, $R^3$ are selected from: —H, —$(C_1-C_{12})$-alkyl, —O—$(C_1-C_{12})$-alkyl, —$(C_6-C_{10})$-aryl, —CN, $NO_2$;

b) adding $P(NX_2)_3$, where X is —$(C_1-C_6)$-alkyl;

c) reacting the compound from a) and b) to give a compound of the formula (II):

(II)

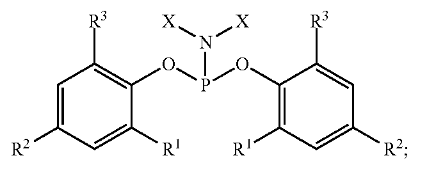

d) adding the compound of the formula (I):

(I)

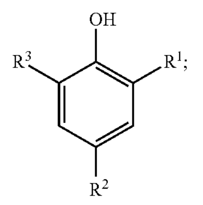

e) adding a compound Y, wherein Y is a five-membered ring in which at least one carbon atom has been replaced by a nitrogen atom;

f) reacting the compounds from c) to e) to give a compound of the formula (III):

(III)

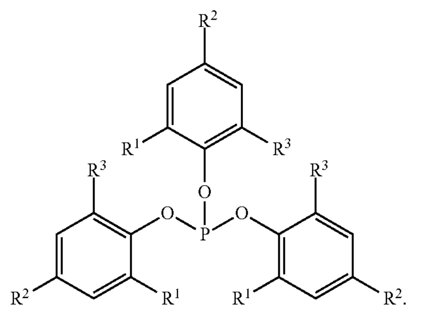

2. Process according to claim 1, wherein $R^1$, $R^2$, and $R^3$ are selected from: —H, —($C_1$-$C_{12}$)-alkyl, —O—($C_1$-$C_{12}$)-alkyl, and —($C_6$-$C_{10}$)-aryl.

3. Process according to claim 1, wherein $R^1$, $R^2$, and $R^3$ are selected from: —H, —($C_1$-$C_{12}$)-alkyl, O—($C_1$-$C_{12}$)-alkyl.

4. Process according to claim 1, wherein X is —($C_1$-$C_2$)-alkyl.

5. Process according to claim 1, wherein X is —$CH_3$.

6. Process according to claim 1, wherein the five-membered ring (Y) has at least one double bond.

7. Process according to claim 1, wherein the five-membered ring (Y) has two double bonds.

8. Process according to claim 1, wherein the five-membered ring (Y) has at least one N—H bond.

9. Process according to claim 1, wherein the five-membered ring (Y) has at least two nitrogen atoms.

10. Process according to claim 1, wherein the five-membered ring (Y) has at least three nitrogen atoms.

11. Process according to claim 1, wherein the five-membered ring (Y) has four nitrogen atoms.

12. Process according to claim 1, wherein Y is the following compound:

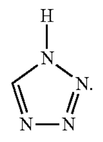

13. Process according to claim 1, comprising the additional process step of c'):

c') adding a solvent.

14. Process according to claim 13, wherein the solvent is selected from: aceonitrile, toulene, xylene, THF, and heptane.

* * * * *